United States Patent [19]

Kawakami et al.

[11] Patent Number: 4,475,668

[45] Date of Patent: Oct. 9, 1984

[54] METERING FEEDER FOR LIQUID

[75] Inventors: Shigezo Kawakami, Kobe; Hiroshi Omura, Kakogawa; Katsumi Ogawa, Amagasaki, all of Japan

[73] Assignee: Kabushiki Kaisha Kobe Seiko Sho, Kobe, Japan

[21] Appl. No.: 378,330

[22] Filed: May 14, 1982

[30] Foreign Application Priority Data

May 15, 1981 [JP] Japan .................. 56-73951

[51] Int. Cl.³ .............................................. B67D 5/08
[52] U.S. Cl. ..................................... 222/52; 222/162; 222/163; 604/65; 137/486
[58] Field of Search ....................... 222/59, 64, 52, 36, 222/40, 23, 160, 163, 420; 604/65, 66, 50, 245; 137/486, 485

[56] References Cited

U.S. PATENT DOCUMENTS

| | | | |
|---|---|---|---|
| 2,126,731 | 8/1938 | Burnham | 222/420 |
| 3,655,095 | 4/1972 | Kienitz | 222/59 |
| 4,258,723 | 3/1981 | McCue et al. | 604/50 |

FOREIGN PATENT DOCUMENTS 296037 4/1954 Switzerland .................. 222/52

*Primary Examiner*—H. Grant Skaggs
*Assistant Examiner*—Kenneth Noland
*Attorney, Agent, or Firm*—Oblon, Fisher, Spivak, McClelland & Maier

[57] ABSTRACT

An apparatus wherein liquid may be continuously fed at a constant small rate includes a liquid reservoir displaceable up and down and provided at a lower portion thereof with a liquid delivery orifice block, a small liquid dropping tank displaceably supported for up and down movement and provided with a liquid dropping chute and an intake nozzle communicating with the orifice block and disposed at a location lower than the location where the liquid dropping chute is attached to the small liquid dropping tank, a photoelectric droplet counting mechanism provided facing a dropping portion of the dropping chute, and a reservoir raising/lowering mechanism and a tank raising/lowering mechanism adapted respectively to either raise or lower the liquid reservoir and dropping tank in accordance with signals from the counting mechanism. The above apparatus is particularly suitable for feeding a rated amount of the liquid such that its viscosity increases considerably when a certain magnitude of compression and shear forces are applied.

8 Claims, 4 Drawing Figures

METERING FEEDER FOR LIQUID

BACKGROUND OF THE INVENTION

1. Field of the Invention:

This invention relates to a metering feeder for a variety of liquids, and more specifically to an apparatus most suitable for feeding a rated amount of such a liquid that its viscosity increases considerably when a certain magnitude of compression and shear forces (may hereinafter be referred to simply as "liquid") are applied thereto. As an example of such a liquid, a "TEFLON" emulsion which is useful as a particle binder may be mentioned.

2. Description of the Prior Art:

No satisfactory metering feeders of the above type have yet been marketed due in part to little demand for such feeders from the industry. Whenever a need for feeding liquid at a constant low rate arises, it is now managed to meet such need with a general metering feeder for fluid such as plunger pump, trochoid pump, vane pump or peristaltic pump although such a general metering feeder may not be able to derive a fully satisfactory result.

Among such conventional metering feeders, the plunger, vane and trochoid pumps, each induces compression and shear forces between its rotating members and/or in a spacing between its rotating member and casing upon feeding a liquid, thereby making the viscosity of the liquid considerably greater and making it impossible, needless to say, not only to feed the liquid at a predetermined, constant, small rate but also even to feed the liquid in a rated amount per unit time along the passage of its operation. For example, in the case of the above-referred to "TEFLON" emulsion, "TEFLON" is fibrillated into solid substances under the action of compression and shear forces and any subsequent metered feeding becomes infeasible.

On the other hand, a peristaltic pump performs drawing and delivery of liquid by continuously squeezing out liquid in flowing a tube by means of rotors. Here, the viscosity of the liquid also increases to a considerable extent and the tube is eventually clogged after a predetermined operation time. (due to the formation of solid substances when the liquid is a "TEFLON" emulsion), thereby also making further metered feeding impossible.

Whenever such prior art pumps developed such a problem, it has been possible to make them usable again by disassembling them and removing gumming, solid substances and the like stuck on the casings and rotating members thereof.

Accompanying an expansion in the technical field in which such liquids are handled as raw materials, there has recently been a strong demand for the development of an apparatus which can perform a continuous rated supply (particularly, small and rated supply) of liquid over a long time period.

SUMMARY OF THE INVENTION

With the foregoing in view, the present invention has been completed. Accordingly, an object of this invention is to provide an apparatus which is capable of continuously feeding a liquid such as a "TEFLON" emulsion at a constant rate, and notably, at a constant low rate over a long period of time.

As one aspect of this invention, there is thus provided an apparatus for feeding a liquid at a constant rate which comprises a liquid reservoir (hereinafter called a "reservoir" for simplicity) displaceably supported for up and down movement and provided at a lower portion thereof with a liquid delivery orifice block (hereinafter called an "orifice block"), a small liquid dropping tank (hereinafter called "small dropping tank) displaceably supported for up and down movement and provided with a liquid dropping chute (hereinafter referred to simply as a "chute") and an intake nozzle communicating with the orifice block and disposed at a location lower than the location where the chute is attached to the small dropping tank, photoelectric droplet counting means provided facing a dropping portion of the chute, and reservoir raising/lowering means and tank raising/lowering means adapted respectively to either raise or lower the reservoir and small dropping tank in accordance with signals from the counting means.

Owing to the adoption of the above-mentioned structure, it has become possible to continuously feed a liquid such that its viscosity increases considerably due to a certain magnitude of compression and shear forces, for example, a "TEFLON" suspension, at a constant rate, and notably, at a constant low rate over a long period of time.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
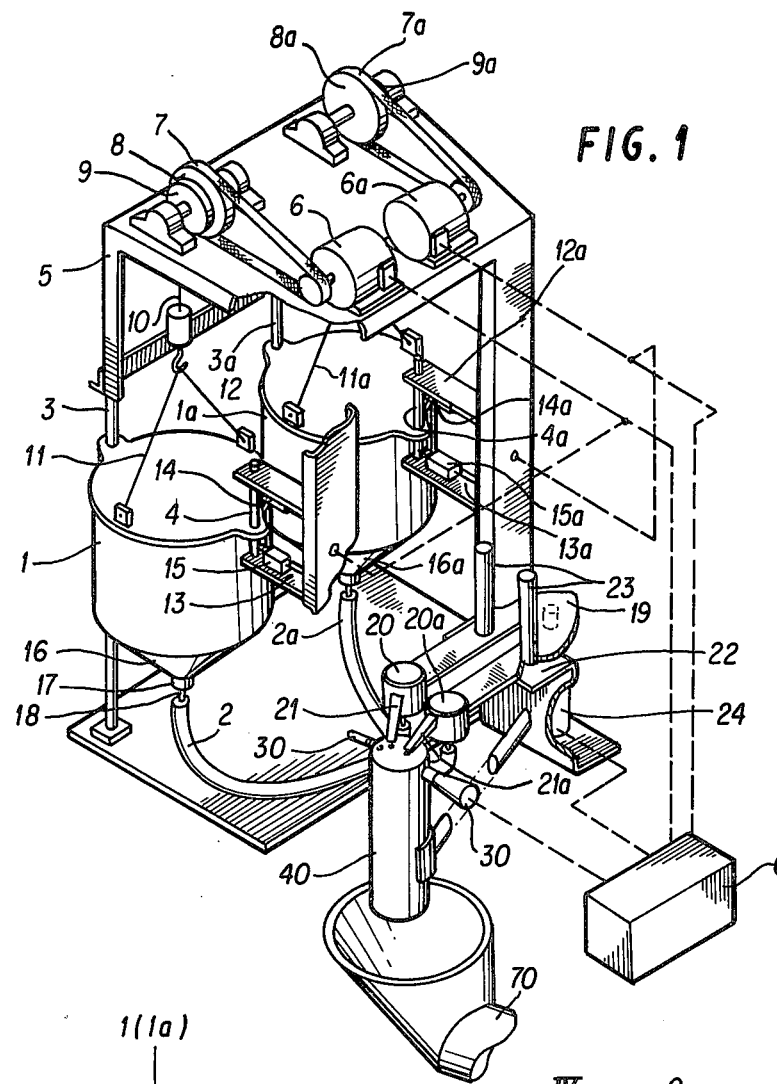
FIG. 1 is a partially cut-away perspective view of the metering feeder according to one embodiment of this invention.

Referring first to FIG. 1, numerals 1, 1a designate reservoirs while small dropping tanks are shown by numerals 20, 20a. Designated by numerals 21, 21a are chutes. Droplet counting means and a sensing tube are respectively shown by numerals 30 and 40. Liquids respectively fed to small dropping tanks 20, 20a through their corresponding tubes 2, 2a from the bottoms of their respective reservoirs 1, 1a are allowed to drop from the chutes 21, 21a while being monitored by the droplet counting means 30. Thereafter, these liquid droplets fall down through the sensing tube 40 and are eventually supplied at constant rates into a feeding funnel 70 of a subsequent apparatus.

More specifically describing the metered feeder, the reservoirs 1, 1a are displaceable up and down by motors 6, 6a mounted on the top of a support frame 5 via their corresponding timing belts 7, 7a, timing pulleys 8, 8a, drums 9, 9a and wires 10 (the corresponding wire on top right hand portion of FIG. 1 not being shown), 11, 11a while being guided respectively by guide rods 3, 4 and guide rods 3a, 4a. Here, the wires 10 are respectively wound up on the drums 9, 9a which are integral with their respective timing pulleys 8, 8a. Accordingly, the wires 10 can be either wound up or paid out by rotating the timing pulleys 8, 8a in desired directions.

On upper fixing strips 12, 12a and lower fixing strips 13, 13 provided to support the guide rods 4, 4a, are provided respectively upper limit switches 14, 14a and lower limit switches 15, 15a. Through the actuation of these limit switches 14, 15, 14a, 15a, the ranges of distance of the up and down displacement of the reservoirs 1, 1a are independently limited. Thus, the reservoirs 1, 1a are allowed to move up and down freely within the predetermined height ranges without being shaken.

Figure 2:
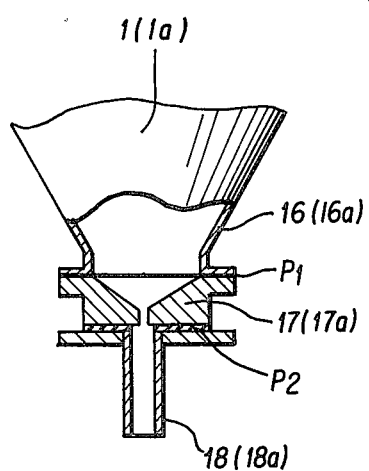
FIG. 2 is an enlarged cross-sectional view of a lower portion of the reservoir.

As illustrated in an enlarged scale in FIG. 2, bottom portions 16, 16a of the reservoirs 1, 1a are provided in a secured fashion with orifice blocks 17, 17a and delivery nozzles 18, 18a respectively. The orifice blocks 17, 17a and delivery nozzles 18, 18a are respectively coupled together with their corresponding packings $P_1$, $P_2$ interposed therebetween.

On the other hand, the small dropping tanks 20, 20a are detachably mounted on free end portions of a U-shaped strip 19. The U-shaped strip 19 is in turn provided displaceably up and down by means of an air cylinder 24 while being guided by guide rods 23, 23 disposed upright on the upper surface of a seat 22 which is provided in adjacent to a corner of a rectangular base plate 50.

Figure 3:
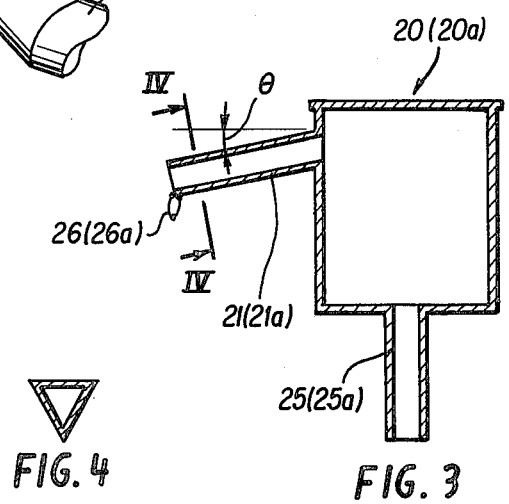
FIG. 3 is an enlarged cross-sectional view of the small dropping tank.

The small dropping tanks 20, 20a are, as depicted in FIG. 3, provided centrally at their bottom walls with intake nozzles 25, 25a respectively. The chutes 21, 21a are each also provided at upper parts of the small dropping tanks 20, 20a with a preset depression angle $\theta$. The chutes 21, 21a are respectively provided at their lower free end portions with substantially spherical guide pieces 26, 26a. In view of their liquid droplet forming capacity, it is preferred to use, as such guide pieces 26, 26a, downwardly-pointed pieces of the so-called inverted acorn shape as shown in FIG. 3.

The intake nozzles 25, 25a and the delivery nozzles 18, 18a provided on the lower portions 16, 16a of the reservoir 1, 1a are respectively communicated with the tubes 2, 2a. Thus, the liquids in the reservoirs 1, 1a are allowed to flow through the orifice blocks 17, 17a, delivery nozzles 18, 18, tubes 2, 2a and intake nozzles 25, 25a into the small dropping tanks 20, 20a. The flow rates of the liquids are determined by the differences between the liquid levels in the reservoirs 1, 1a and those in the small dropping tanks 20, 20a as well as the inner diameters of the orifice blocks 17, 17a.

Figure 4:
FIG 4 is a cross-sectional view taken along line IV—IV of FIG. 3.

Liquid droplets of a uniform size may be stably formed at the free ends of the chutes 21, 21a and may be dropped one after another into the sensing tube 40 be setting the depression angles $\theta$ of the chutes 21, 21a small, forming the cross-sections of the chutes 21, 21a into V-shapes as shown in FIG. 4 and providing the above-mentioned substantially spherical guide pieces 26, 26a on the lower free end portions of the chutes 21, 21a.

The size of each droplet and number of droplets are largely dependent on the deprssion angles $\theta$ of the chutes 21, 21a. It is generally preferred to set these depression angles $\theta$ at about 10° or so. The dropping state is continuously monitored by means of the counting means 30 provided at upper portions of the sensing tube 40. The number of droplets is counted at the control unit 60 and displayed there. Liquid droplets, which have passed through the sensing tube 40, are then fed to the feeding funnel 70 of the subsequent apparatus.

The above apparatus is normally operated using only one feeding route (for example, the route starting from the reservoir 1). Prior to operating the apparatus, it is necessary to suitably adjust the inner diameter of the orifice block 17 and/or the depression angle $\theta$ of the chute 21 so as to obtain desired droplets. The dropping operation is then started by either raising or lowering the reservoir 1 through actuation of the motor 6 to set at a predetermined value the difference in height between the liquid level in the reservoir 1 and that in the small dropping tank 20. Then, its operation mode can be switched to the automatic operation mode by actuating the above-mentioned droplet counting means 30. Whenever the counting means 30 detects in the course of the automatic dropping operation that the number of droplets per unit time has varied from a predetermined value, the above-mentioned difference in liquid level is adjusted by raising or lowering the reservoir 1 through the motor 6, timing belt 7, timing pulley 8, drum 9 and wires 10, 11 in accordance with a signal from the control unit 60 so as to correct the number of droplets per unit time so as to return to the predetermined value.

Even if the delivery nozzle 18 develops clogging or the counting means 30 malfunctions, the motor 6 is also actuated upon receipt of a signal from the control unit 60. However, the upward or downward movement of the reservoir 1 is automatically stopped at its permissible uppermost or lowermost position because the guide rod 4 is provided, as mentioned above, with the upper limit switch 14 and lower limit switch 15 and either one of the limit switches is activated to generate a detection signal to the motor 6 so as to automatically stop the motor 6.

If any sudden change occurs with respect to the number of droplets per unit time, this change is detected at the control unit 60. The control unit 60 then generates a warning sound and, at the same time, actuates the air cylinder 24, thereby raising the proximal end of the chute 21 on the small dropping tank 20 above the liquid level in the reservoir 1 and stopping any further dropping operation. This permits to operator to determine the cause of the abnormality. The metering supply of the liquid may not be suspended even during the determination of the abnormality when the dropping operation is carried out through the other feeding route (for example, the route starting from the tank 1a). A counter incorporated in the control unit 60 serves to determine whether the number of droplets per unit time has returned, subsequent to the removal of the cause of the abnormality, to the normal, predetermined value. The liquid level difference may be adjusted to an optimum value by manually operating the motor 6 if necessary. Once the number of droplets per unit time returns to the normal value, the operation mode of the motor 6 may be switched back to the automatic operation mode. Here, the predetermined liquid level difference has again been established thereby ensuring a continuous rated supply of the liquid at the predetermined droplet value.

Needless to say, the present apparatus may be applied not only as a metering feeder for liquid of the aforementioned type (inclusive of emulsion) but also as a metering feeder for use in a field which involves a rated small supply of other liquids, for example, a reaction fluid, a chemical solution, cultivation solution, a or the like.

Having now fully described the invention, it will be apparent to one of ordinary skill in the art that many changes and modifications can be made thereto without departing from the spirit or scope of the invention as set forth herein.

What is claimed as new and is intended to be secured by Letters Patent is:

1. An apparatus for feeding a liquid at a constant rate comprising:
   a liquid reservoir displaceably supported for up and down movement and which further comprises a liquid delivery orifice block disposed at a lower portion thereof;
   a liquid dropping tank displaceably supported for up and down movement and which further comprises a liquid dropping chute and an intake nozzle communicating with the orifice block and disposed at a location lower than the location where the liquid dropping chute is attached to the liquid dropping tank such that said liquid flows from said liquid reservoir into said liquid dropping tank via said intake nozzle;
   photoelectric droplet counting means provided facing a dropping portion of the dropping chute for generating signals; and
   reservoir raising/lowering means and tank raising/lowering means for raising and lowering the liquid reservoir and dropping tank in accordance with generated signals received from the counting means such that said liquid is continuously fed at said constant rate.

2. The apparatus as claimed in claim 1, wherein the liquid dropping chute further comprises a V-shaped transverse cross-section liquid dropping chute which further comprises a substantially spherical droplet guide piece disposed at a free end of said liquid dropping chute.

3. The apparatus as claimed in claim 2, wherein the liquid dropping chute has a predetermined depression angle.

4. The apparatus as claimed in claim 3, wherein the depression angle comprises approximately a 10° angle.

5. The apparatus as claimed in claim 3, further comprising means for attaching the liquid dropping chute to the liquid dropping tank.

6. The apparatus as claimed in claim 1, 2 or 3, further comprising an upper limit switch and lower limit switch for the small liquid dropping tank which generate a signal for allowing stopping of actuation of the tank raising/lowering means by a generated signal received from either the upper or lower limit switches.

7. The apparatus as claimed in claim 1, 2 or 3, wherein the photoelectric droplet counting means further comprises means for generating a warning sign upon sensing a predetermined abnormality in the number of droplets and, at the same time, for raising the small liquid dropping tank through the tank raising/lowering means to such a point that a proximal end portion of the dropping chute is positioned so as to be higher than the liquid level in the liquid reservoir so as to stop the dropping of the liquid.

8. The apparatus as claimed in claim 1, 2 or 3, wherein the orifice diameter of the liquid delivery orifice block further comprises a variable orifice diameter liquid delivery orifice block.

* * * * *